(12) United States Patent
Dillenberger

(10) Patent No.: US 10,621,376 B2
(45) Date of Patent: *Apr. 14, 2020

(54) PERSONAL LEDGER BLOCKCHAIN

(71) Applicant: International Business Machines Corporation, Armonk, NY (US)

(72) Inventor: Donna N. Dillenberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,142

(22) Filed: Apr. 19, 2018

(65) Prior Publication Data

US 2018/0268162 A1 Sep. 20, 2018

Related U.S. Application Data

(63) Continuation of application No. 14/971,027, filed on Dec. 16, 2015, now Pat. No. 10,013,573.

(51) Int. Cl.
*G06F 21/62* (2013.01)
*G06F 21/10* (2013.01)
(Continued)

(52) U.S. Cl.
CPC ...... *G06F 21/6227* (2013.01); *G06F 16/2379* (2019.01); *G06F 16/27* (2019.01);
(Continued)

(58) Field of Classification Search
CPC .. G06F 21/6227; G06F 16/27; G06F 16/2379; G06F 21/10; G06F 2221/0704;
(Continued)

(56) References Cited

U.S. PATENT DOCUMENTS 9,870,562 B2 * 1/2018 Davis ..................... G06Q 20/02
9,892,460 B1 * 2/2018 Winklevoss ........... G06Q 40/04
(Continued)

OTHER PUBLICATIONS

Non-Final Office Action for U.S. Appl. No. 14/971,027 dated Aug. 7, 2017.
List of IBM Patents or Patent Applications Treated As Related.

*Primary Examiner* — Gheng-Feng Huang
(74) *Attorney, Agent, or Firm* — Fleit Intellectual Property Law; Jon Gibbons

(57) ABSTRACT

A system, method, and computer readable storage medium configured for storing encrypted data in a blockchain. To write additional data in a blockchain, a request is received at a computing node. The request is typically cryptographically signed by a user system to include a new transaction with additional data in the blockchain. The additional data is previously encrypted with an encryption key. A new block that records the new transaction with additional data in the blockchain is added. To read the additional data in a blockchain, a request is received at a computing node with a transaction identifier and a decryption key from a user system to access data journaled as part of the blockchain in the transaction database. The transaction database is searched using the identifier. In response, to finding the corresponding block in the blockchain, the data is decrypted using the decryption key.

18 Claims, 5 Drawing Sheets

(51) Int. Cl.
*G06F 16/23* (2019.01)
*H04L 9/32* (2006.01)
*G06F 16/27* (2019.01)

(52) U.S. Cl.
CPC ............ *G06F 21/10* (2013.01); *H04L 9/3236* (2013.01); *G06F 2221/0704* (2013.01); *H04L 2209/38* (2013.01); *H04L 2209/56* (2013.01)

(58) Field of Classification Search
CPC .............. H04L 9/3236; H04L 2209/56; H04L 2209/38
See application file for complete search history.

(56) References Cited

U.S. PATENT DOCUMENTS

| | | |
|---|---|---|
| 10,313,360 B2 | 6/2019 | Wilson |
| 2006/0136341 A1 | 6/2006 | Wajs |
| 2015/0244690 A1* | 8/2015 | Mossbarger .......... H04L 63/061 |
| | | 713/171 |
| 2016/0267605 A1* | 9/2016 | Lingham ................ G06Q 40/12 |
| 2016/0342989 A1 | 11/2016 | Davis |
| 2017/0017936 A1* | 1/2017 | Bisikalo ............. G06Q 20/065 |
| 2017/0017954 A1* | 1/2017 | McDonough .......... G06Q 20/36 |
| 2017/0046792 A1* | 2/2017 | Haldenby .......... G06Q 20/0655 |
| 2017/0091750 A1* | 3/2017 | Maim ................... H04L 9/3236 |
| 2017/0132625 A1 | 5/2017 | Kennedy |
| 2018/0343114 A1 | 11/2018 | Ben-Ari |
| 2018/0349877 A9* | 12/2018 | Maim ................... H04L 9/3236 |

* cited by examiner

PERSONAL LEDGER BLOCKCHAIN

BACKGROUND

The present invention generally relates to digital content management systems, and more particularly to digital rights management of content in distributed databases.

Users seek more and more assurances against unauthorized access, copying and usage of their personal data. Examples of personal data include medical files, documents, financial documents, software, and other multimedia content.

SUMMARY

Blockchains or blockchain is a distributed database that keeps a continuously growing list of data records. Each data record is protected against tampering and revisions. Blockchains are used with public ledgers of transactions, where the record is enforced cryptographically. This invention enables transactions to be private by encrypting the contents of the transaction and only users or entities that have the key to the transaction can view the transaction.

In one example, disclosed is the use of virtual private ledgers in blockchains that are encrypted using personal security keys. The initiator(s) of transactions sign and encrypt their information in the ledger. Only key holders can view the information. The blockchain software can still hash on the contents of the transaction but not view it.

Disclosed is a novel system, computer program product, and method which enables a storing encrypted data in a blockchain. To write additional data in a blockchain, a request is received at a computing node. The request is typically cryptographically signed by a user system to include a new transaction with additional data in the blockchain. The additional data is previously encrypted with an encryption key. A new block that records the new transaction with additional data in the blockchain is added.

To read the additional data in a blockchain, a request is received at a computing node with a transaction identifier and a decryption key from a user system to access data journaled as part of the blockchain in the transaction database. The transaction database is searched using the identifier for a corresponding block in the blockchain. In response to finding the corresponding block in the blockchain, the data is decrypted using the decryption key. The data that has been decrypted can be shared with the user system.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
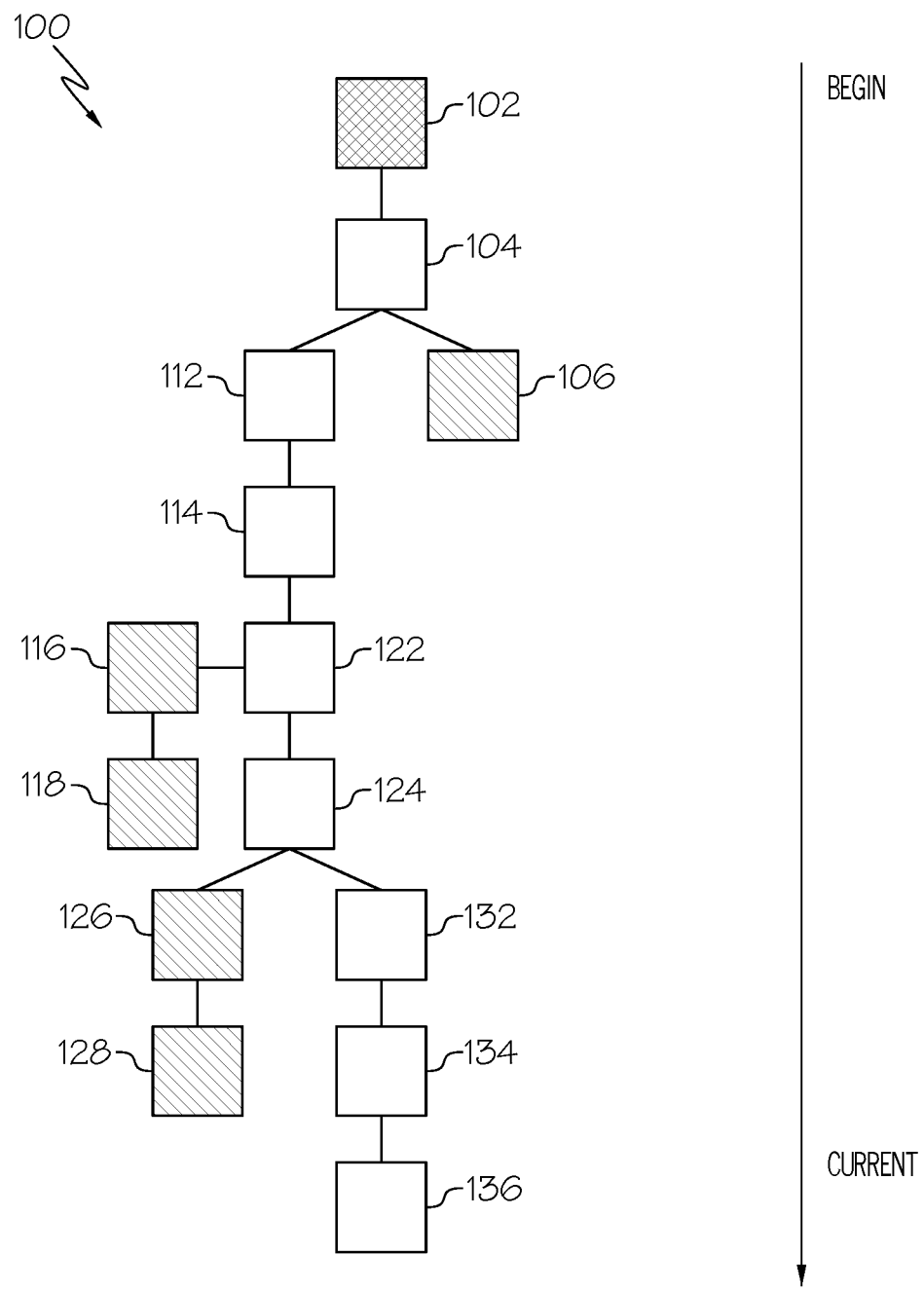
FIG. 1 is a diagram 100 illustrating a simple blockchain.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Described is a method, data processing system, and computer program product for providing personal ledger blockchains. Unlike current blockchains which allow computer systems to read the contents of a blockchain. This invention encrypts transactions before they are added to blockchains, while also allowing the encrypted contents to be added to the blockchain. Holders of the security keys for the encrypted transactions can then share the keys with other entities.

A user or initiator can have different keys for different types of transactions, e.g. a key to entries pertaining to just their medical records or a key that allows others to just see their automobile maintenance records, a separate key for investment transactions. The initiator of transactions can then choose to give the key to each type of records to other entities. For example, they can give a key to their auto records to auto insurance companies to receive lower premiums because their virtual private auto maintenance ledger have entries documenting all the maintenance and repairs provided to their car from garages, service dealerships, repair shops. The owner/initiator of transactions can give a separate key to their medical records to hospitals, physicians, etc. to read and to also add additional medical claims/records to the blockchain when new procedures are done for the owner/initiator.

The present invention provides blockchain security and ledger services that allow participants to encrypt different types of records, with different keys that still allow blockchain hashing and verification but does not allow public participants to view the data without the key. The owner(s) of the transaction(s) can send the keys for a subset of the owner(s)' transactions to only the participants they wish to view/modify/add to their virtual private ledger.

In one example, the invention works by providing security keys that can encrypt data so that the data can also be hashed for blockchain addition and verification but not allow the contents to be read without the key.

This invention also enables different transaction types to be encrypted with different keys, allowing participants of the transactions to share different keys for their transactions with other entities. So one can have a separate key for "Medical transactions." One can have separate keys for "Financial transactions." One can have separate keys for "Real Estate transactions," etc. All these different types of transactions can still be hosted in a blockchain, enabling the blockchain to support multiple virtual private ledgers for participants.

Non-Limiting Definitions

The terms "a", "an" and "the" are intended to include the plural forms as well, unless the context clearly indicates otherwise.

The term "blockchain" or "blockchain" is a distributed database that keeps a continuously growing list of data records. Each data record is protected against tampering and revisions. Blockchains are used with public ledgers of transactions, where the record is enforced cryptographically.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computing node" is used to mean computational device with an internal address that can host a copy of a blockchain and the associated transactions.

The term "hash function" is a mathematical algorithm turns an arbitrarily-large amount of data into a fixed-length size. The same hash will always result from the same data, but modifying the data by even one bit will completely change the hash. The values returned by the hash function are called a "hash".

The term "public ledger" is a public accessible listing of transactions for the distributed database or blockchain.

Blockchain with Encrypted Data

FIG. 1 is a diagram 100 illustrating a simple blockchain. Blocks in the main chain 102, 104, 112, 114, 122, 124, 132, 134, 136 are the longest series of blocks that go from the beginning block 102 to the current block 136. For any block in the blockchain, there is only one path from the beginning block 102 to the current block 136. Blocks 106, 116, 118, 126, 128 are blocks that are not in the longest chain. Because this is distributed system, blocks 116, 118, 126, 128 are typically created only a few seconds apart from the main chain. Whenever a fork happens, generating computing nodes build onto which ever block is received first in time. Therefore the short chain of blocks 116, 118, 126, 128 not used.

The blockchain 100 implementation consists of two kinds of records: transactions and blocks. Transactions are the actual data stored in the blockchain. As shown the data in each of the blockchain is encrypted as shown graphically by the lock. In one example, the data in each blockchain is encrypted with its own unique key. In another example, data that is dividable into sections within each block, such as, a music track from a complete CD recording or an image in series of images, is encrypted with its own unique encryption key. Transactions are created by participants using the system.

The blocks are recorded that confirm when and in what sequence certain transaction become journaled as back of the blockchain database.

Figure 2:
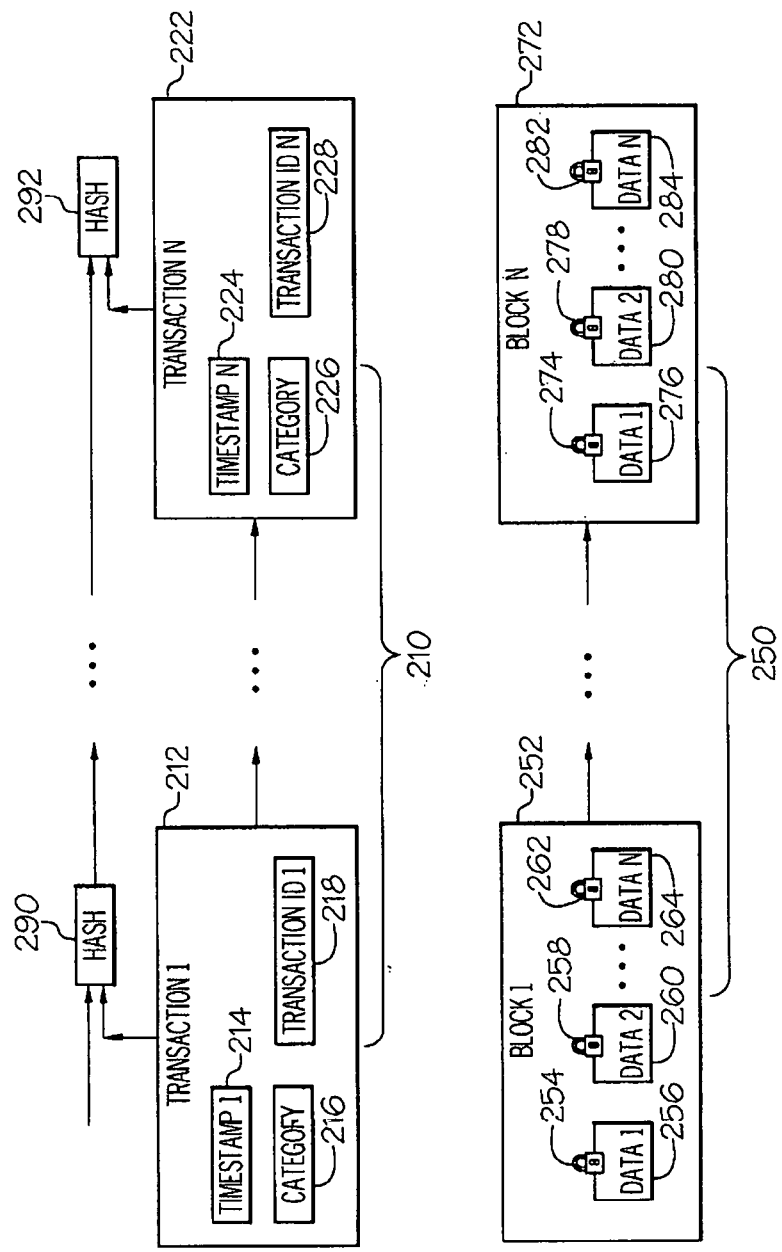
FIG. 2 is a functional diagram illustrating details of each block and transaction in the blockchain of FIG. 1.

FIG. 2 is a functional diagram 200 illustrating details of each block and transaction in the blockchain of FIG. 1. Shown are two kinds of record blocks 210 and transactions 250. The transactions 250 are actual data stored in the blockchain 200. The blocks 210 are records of transactions.

Record blocks 210 represent a series of transactions 212 through 222 as shown for transactions 1 through transaction n respectively. Each block 210 representing a transaction typically includes a timestamp 214, 224 of the transaction. A unique transaction identifier 218, 228 is also shown. This transaction id can be search for a specific item. Also shown is an optional category for the transaction 216, such as photo, medical, financial, employment, etc. to associate with the additional data in the transactions 250 described below.

A hash function 290 and 292 is shown as part of the record blocks 210. In one implementation of a blockchain, the previously hash function 290 is input to a subsequent hash function 292, along with the transaction 1 as shown. This ensures that there has been no tampering or alteration of the data in the record blockchain.

Transactions 250 shown in block 1 through block n, (252, 272) contain user or additional data 256, 260, 264, 276, 280, 284. The additional data can represent any multimedia data including text, audio, video, images, financial statements, and more. The additional data is all encrypted illustrated by locks 254, 258, 262, 274, 278, 282. The data in each block 252, 272 can be encrypted with a symmetrical key, a public-private key or other cryptographic key.

A common encryption key may be used for each the additional data in each block 252, 292. For example, suppose that the user wants to share a first medical image data 1 (276) with one physician represented and a second medical image data n (278) with another physical represented. Only one decryption key would be required in this example. Since the identical encryption key was used for both.

In another example, a unique key is required for a unique lock 254, 258, 262, 274, 278, 282 used for each portion of additional data 256, 260, 264, 276, 280, 284. In this example, suppose that the user wants to share a first medical image data 1 (256) with one physician represented and a second medical image data n (260) with another physical represented. Two keys would be independent and separate description keys would be needed in this example since two different encryption keys were used.

Flow Diagram of Storing Content Encrypted in a Blockchain

Figure 3:
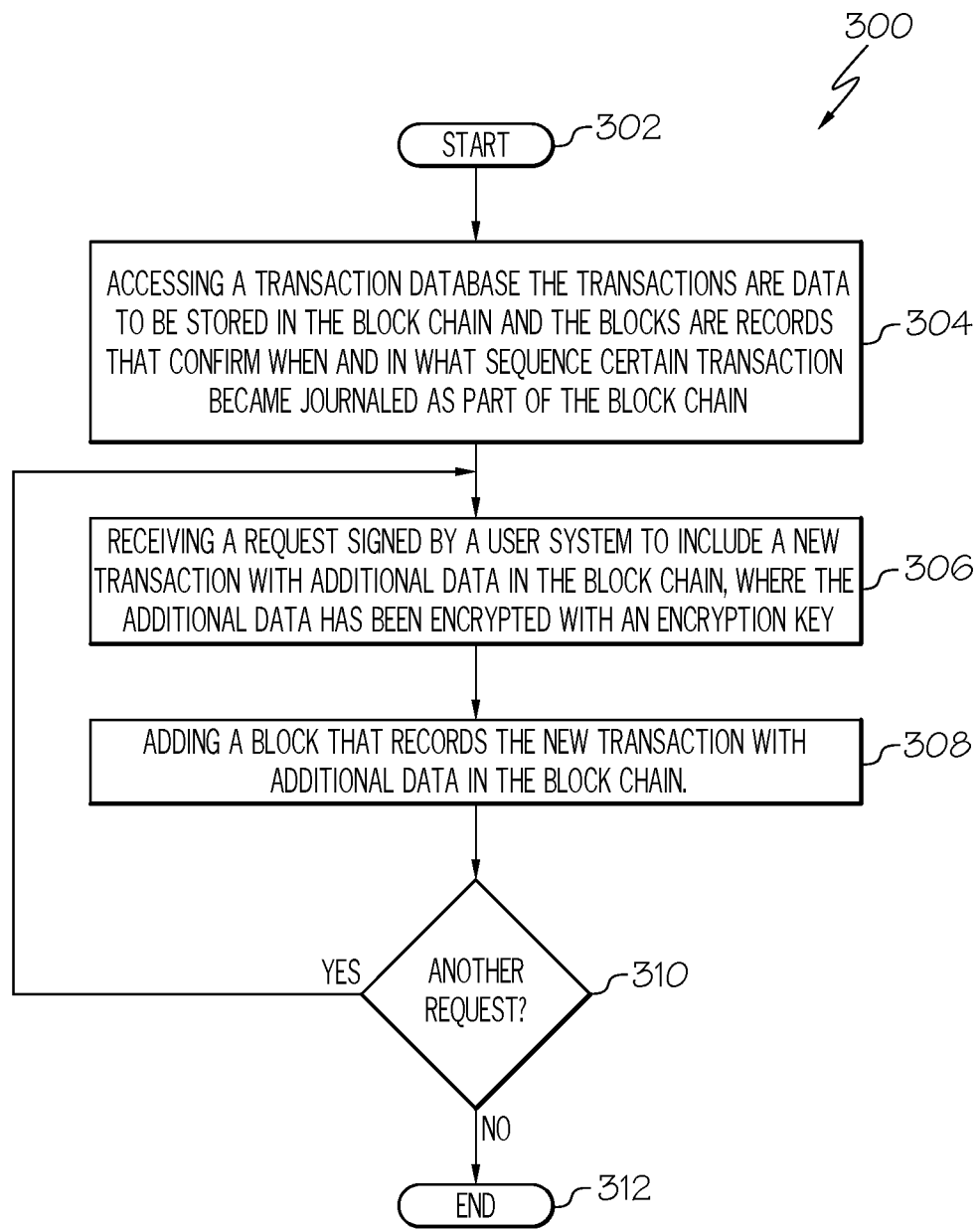
FIG. 3 is a flow diagram illustrating storing content encrypted in a blockchain by a user.

FIG. 3 is a flow diagram 300 illustrating storing content encrypted in a blockchain by a user. The process begins in step 302 and immediately proceeds to step 304. A computing node receives are request from a user or entity. The computing node is one of multiple computing nodes in a system using a blockchain protocol to share a transaction database. As described above, the transactions 250 are data to be stored in the blockchain 200 and the record blocks 210 are records that confirm when and in what sequence certain transaction became journaled as part of the blockchain 200.

Typically the request received is signed by a user system to include a new transaction with additional data in the blockchain, where the additional data has been encrypted with an encryption key in step 306. The encryption key may be a symmetrical key, public-private key, other cryptographic key, or a combination thereof.

In another example, the additional data may be divided into a plurality of sections and each of the sections is encrypted with its own unique encryption key.

A category may be assigned to the additional data and the encryption key is associated with the category.

In step 308, a block or record block 210 is added that records the new transaction with additional data in the blockchain 200. A transaction ID 218, 228, which is unique to each transaction in the blockchain is included. Optionally, a timestamp 214, 222, and/or category 216, 226 of the additional data is included 216, 226. Also, a hash 292 of a previous block 212, 290 combined with the current block 222 may be included as well to make tampering or changes to the blockchain 200 difficult.

A test is made in step 310 to see if there is another request from the user system to include more data. If there is subsequent request, the process returns to step 306. Otherwise the process flow ends in step 312.

Flow Diagram of Reading Content Encrypted in a Blockchain

Figure 4:
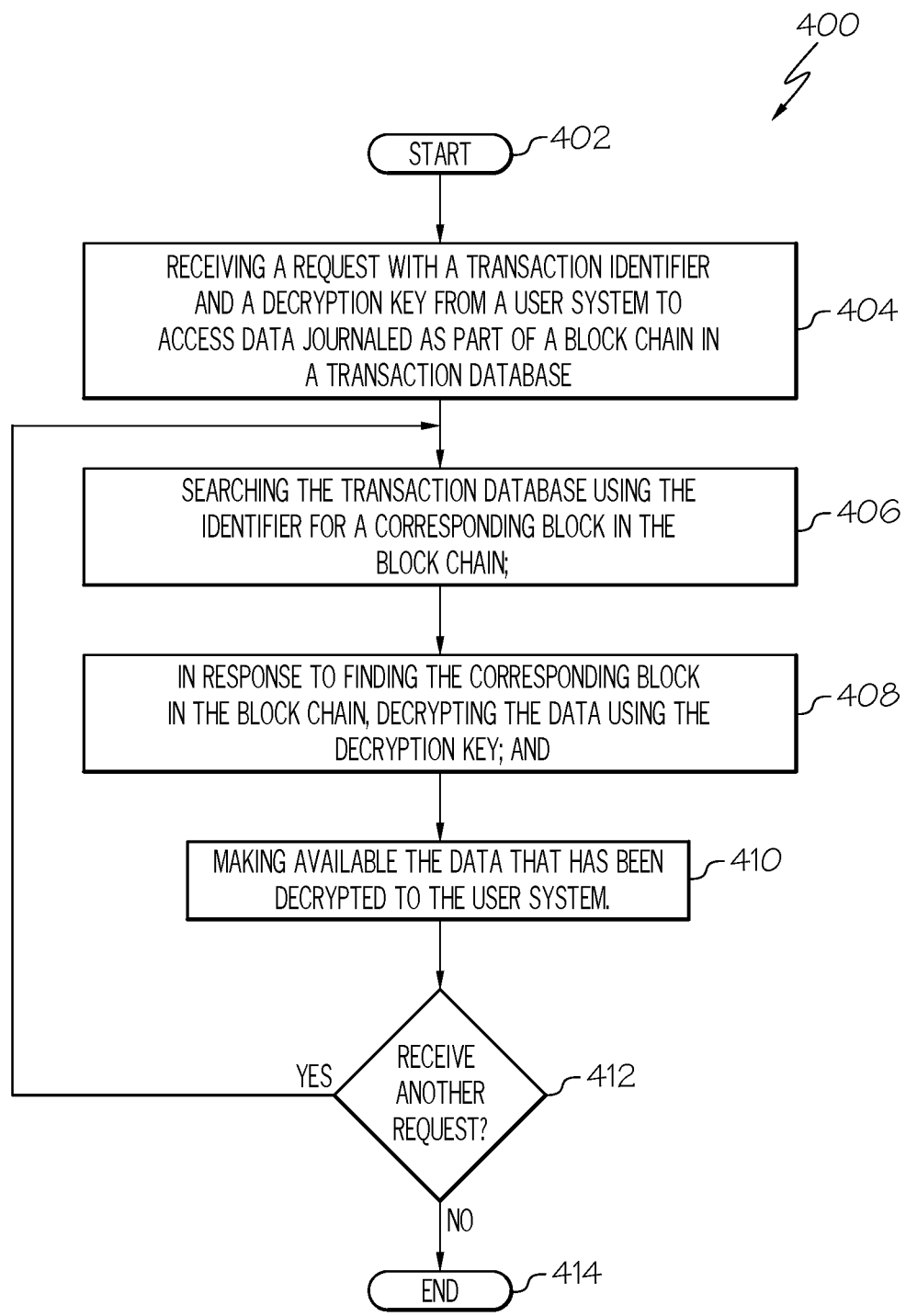
FIG. 4 is a flow diagram illustrating reading content encrypted in a blockchain by a user.

FIG. 4 is a flow diagram 400 illustrating reading content encrypted in a blockchain by a user. The process begins in step 402 and immediately proceeds to step 404. A computing node receives a request from a user or entity. The computing node is one of multiple computing nodes in a system using a blockchain protocol to share a transaction database. As described above, the transactions 250 are data to be stored in the blockchain 200 and the record blocks 210 are records that confirm when and in what sequence certain transaction became journaled as part of the blockchain 200.

In step 406, after the request is received with a transaction identifier 218, 228 and a decryption key from a user system to access data journaled as part of a blockchain 200. The transaction database is searched using the identifier for a corresponding block in the blockchain 200.

In response to finding the corresponding block in the blockchain 200, decrypting the data using the decryption key in step 408. The data that has been decrypted is made available to the user system in step 410.

A test is made in step 412 to determine if there is another request. In response to another request being received, the process returns to step 406, otherwise the process ends in step 414.

In one example each of the data is divided into a plurality of sections and each of the sections is decrypted with its own unique decryption key. In another example, the data that has been decrypted includes making available a category 216, 226 associated with the data.

Generalized Computing Environment

Figure 5:
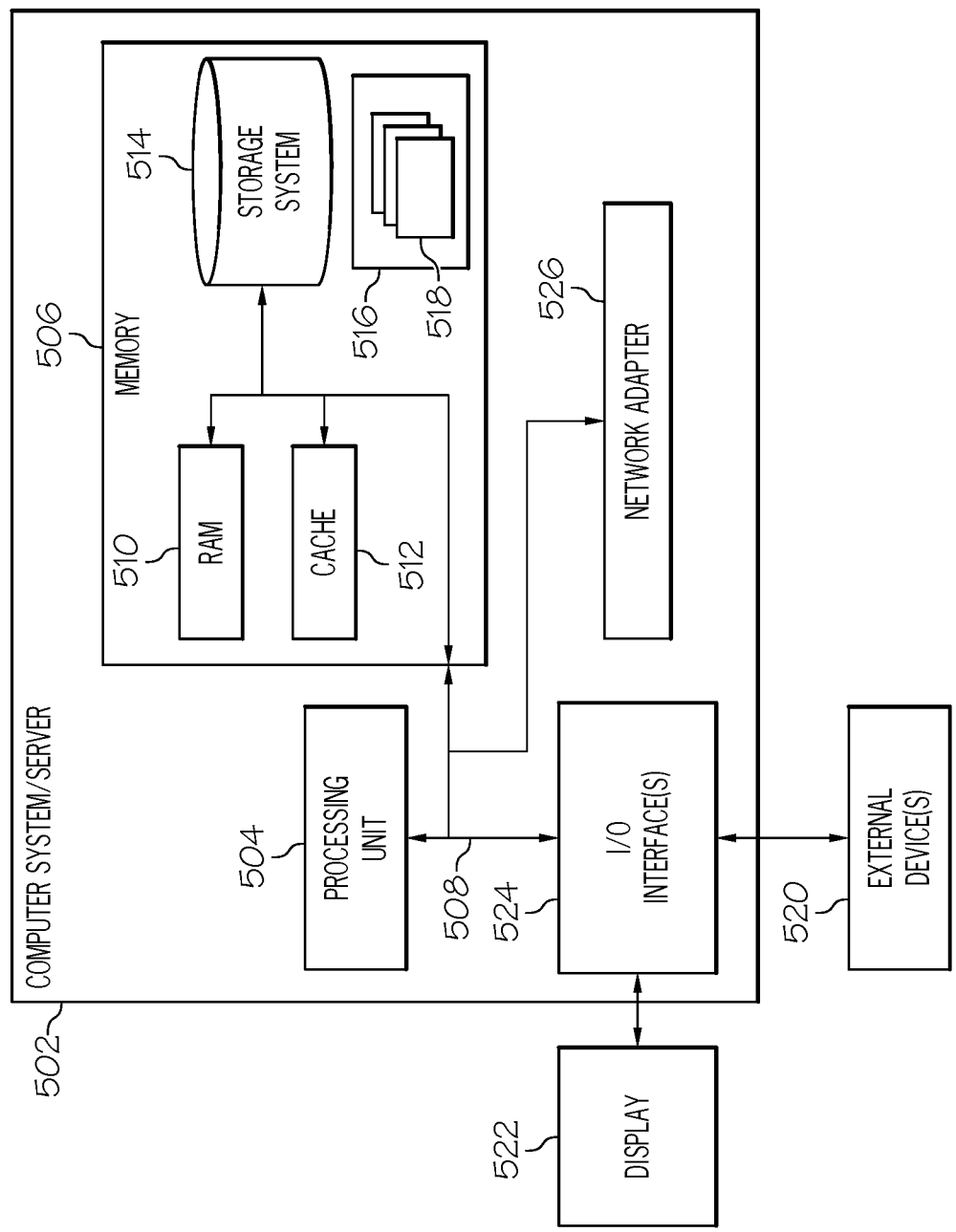
FIG. 5 illustrates one example of a computing or processing node for operating a node in a blockchain.

FIG. 5 illustrates one example of a computing or processing node 500 for operating a node in a blockchain. This is not intended to suggest any limitation as to the scope of use or functionality of embodiments of the invention described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506, in one embodiment, implements the flow diagram of FIG. 3 and the flow chart of FIG. 4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 508 by one or more data media interfaces. As will be further depicted and described below, memory 506 may include at least one program product having a set (e.g., at least one) of program modules that are configured to carry out the functions of various embodiments of the invention.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method comprising:
   accessing, by a processor, a transaction database shared by all computing nodes participating in a system based on a blockchain protocol, the transaction database including transactions and blocks, where the transactions are data to be stored in a blockchain and the blocks are records that confirm when and in what sequence certain transaction became journaled as part of the blockchain;
   receiving a request signed by a user system to include a new transaction with additional data in the blockchain, where the additional data has been previously encrypted by the user system with an encryption key of a user and wherein the additional data is divided into a plurality of sections;
   adding a block that records the new transaction with additional data in the blockchain includes a hash of a previous block and the block which is being added;
   receiving a request with a transaction identifier and a decryption key from another user system to access the additional data;
   searching the transaction database using the transaction identifier for a corresponding block in the blockchain;
   in response to finding the corresponding block in the blockchain, decrypting the additional data using the decryption key; and
   making available the additional data that has been decrypted to the another user system.

2. The computer-based method of claim 1, wherein the adding the block that records the new transaction with additional data in the blockchain includes a timestamp.

3. The computer-based method of claim 1, wherein the adding the block that records the new transaction with additional data in the blockchain includes a transaction identifier.

4. The computer-based method of claim 1, wherein the encryption key is a symmetrical key.

5. The computer-based method of claim 1, wherein the encryption key is part of a public-private key pair.

6. The computer-based method of claim 1, wherein each of the sections is encrypted with its own unique encryption key.

7. The computer-based method of claim 1, further comprising:
   assigning a category to the additional data and the encryption key is associated with the category.

8. The computer-based method of claim 1, further comprising:
   receiving a request with a transaction identifier and a decryption key from another user system to access the additional data;
   searching the transaction database using the transaction identifier for a corresponding block in the blockchain;
   in response to finding the corresponding block in the blockchain, decrypting the additional data using the decryption key; and
   making available the additional data that has been decrypted to the another user system.

9. A system comprising:
   a memory;
   a processor communicatively coupled to the memory, where the processor is configured to perform
      accessing, by a processor, a transaction database shared by all computing nodes participating in a system based on a blockchain protocol, the transaction database including transactions and blocks, where the transactions are data to be stored in a blockchain and the blocks are records that confirm when and in what sequence certain transaction became journaled as part of the blockchain;
      receiving a request signed by a user system to include a new transaction with additional data in the blockchain, where the additional data has been previously encrypted by the user system with an encryption key of a user and wherein the additional data is divided into a plurality of sections;

adding a block that records the new transaction with additional data in the blockchain includes a hash of a previous block and the block which is being added;

receiving a request with a transaction identifier and a decryption key from another user system to access the additional data;

searching the transaction database using the transaction identifier for a corresponding block in the blockchain;

in response to finding the corresponding block in the blockchain, decrypting the additional data using the decryption key; and making available the additional data that has been decrypted to the another user system.

10. The system of claim 9, wherein the encryption key is part of a public-private key pair.

11. The system of claim 9, wherein each of the sections is encrypted with its own unique encryption key.

12. The system of claim 9, wherein the processor is further configured to perform:

assigning a category to the additional data and the encryption key is associated with the category.

13. The system of claim 9, wherein the processor is further configured to perform:

receiving a request with a transaction identifier and a decryption key from another user system to access the additional data;

searching the transaction database using the transaction identifier for a corresponding block in the blockchain;

in response to finding the corresponding block in the blockchain, decrypting the additional data using the decryption key; and making available the additional data that has been decrypted to the another user system.

14. A non-transitory computer program product comprising a computer readable storage medium having computer readable program code embodied therewith, the computer readable program code configured to perform:

accessing, by a processor, a transaction database shared by all computing nodes participating in a system based on a blockchain protocol, the transaction database including transactions and blocks, where the transactions are data to be stored in a blockchain and the blocks are records that confirm when and in what sequence certain transaction became journaled as part of the blockchain;

receiving a request signed by a user system to include a new transaction with additional data in the blockchain, where the additional data has been previously encrypted by the user system encrypted with an encryption key of a user and wherein the additional data is divided into a plurality of sections; and adding a block that records the new transaction with additional data in the blockchain includes a hash of a previous block and the block which is being added;

receiving a request with a transaction identifier and a decryption key from another user system to access the additional data;

searching the transaction database using the transaction identifier for a corresponding block in the blockchain;

in response to finding the corresponding block in the blockchain, decrypting the additional data using the decryption key; and making available the additional data that has been decrypted to the another user system.

15. The non-transitory computer program product of claim 14, wherein the adding the block that records the new transaction with additional data in the blockchain includes a timestamp.

16. The non-transitory computer program product of claim 14, wherein the adding the block that records the new transaction with additional data in the blockchain includes a transaction identifier.

17. The non-transitory computer program product of claim 14, wherein the encryption key is a symmetrical key.

18. The non-transitory computer program product of claim 14, wherein the encryption key is part of a public-private key pair.

* * * * *